US009714636B2

(12) United States Patent
Newburg

(10) Patent No.: US 9,714,636 B2
(45) Date of Patent: *Jul. 25, 2017

(54) AIRCRAFT STARTER MOTOR ASSEMBLY

(71) Applicant: 978652 Ontario Limited, Orillia (CA)

(72) Inventor: Ronald John Newburg, Orillia (CA)

(73) Assignee: 978652 ONTARIO LIMITED, Severn (CA)

( * ) Notice: Subject to any disclaimer, the term of this patent is extended or adjusted under 35 U.S.C. 154(b) by 283 days.

This patent is subject to a terminal disclaimer.

(21) Appl. No.: 14/507,351

(22) Filed: Oct. 6, 2014

(65) Prior Publication Data

US 2015/0096411 A1    Apr. 9, 2015

Related U.S. Application Data

(63) Continuation-in-part of application No. 14/046,280, filed on Oct. 4, 2013, now Pat. No. 9,366,213.

(51) Int. Cl.
| | |
|---|---|
| F16H 3/44 | (2006.01) |
| F02N 11/08 | (2006.01) |
| F02N 15/02 | (2006.01) |
| F02N 15/04 | (2006.01) |
| F16H 1/28 | (2006.01) |

(52) U.S. Cl.
CPC ............ *F02N 11/08* (2013.01); *F02N 15/022* (2013.01); *F02N 15/046* (2013.01); *F16H 1/28* (2013.01); *Y10T 74/137* (2015.01)

(58) Field of Classification Search
None
See application file for complete search history.

(56) References Cited

U.S. PATENT DOCUMENTS

| | | | | |
|---|---|---|---|---|
| 1,754,192 A | * | 4/1930 | Van Vliet | B64D 35/08 |
| | | | | 123/196 R |
| 2,255,575 A | * | 9/1941 | Waseige | F02N 5/04 |
| | | | | 123/179.22 |
| 2,519,118 A | | 8/1950 | Curtis et al. | |
| 4,838,622 A | | 6/1989 | Kircher et al. | |

(Continued)

FOREIGN PATENT DOCUMENTS

CN          101144455 A        3/2008

OTHER PUBLICATIONS

"44MT : Every Start. Every Time", Delco-Remy Connection, Mar. 2013, http://delcoremy.com/Delco-Remy-Connect-Online-Newsletter/March_2013/Images/Delco-Remy-Connect-March-2013.aspx.

(Continued)

*Primary Examiner* — Edwin A Young
(74) *Attorney, Agent, or Firm* — Millman IP Inc.

(57) ABSTRACT

An aircraft starter motor assembly for starting an aircraft engine is provided, and includes a DC motor, a planetary gearset, a ring gear clutch, and a starter adapter. The sun gear from the gearset is mounted to the motor output shaft. The ring gear clutch is used to rotationally fix the ring gear or to permit the ring gear to freewheel. The starter adapter includes a worm, a spring, a worm gear, a wrap spring clutch and an output shaft. The worm drives the worm gear, which drives the output shaft via the wrap spring clutch. By using the ring gear clutch to let the ring gear freewheel, the wrap spring clutch can more easily unwind and disengage from the output shaft after the engine has been started.

11 Claims, 7 Drawing Sheets

(56) References Cited

U.S. PATENT DOCUMENTS

| | | | |
|---|---|---|---|
| 6,605,019 | B1 | 8/2003 | Eckert |
| 9,366,213 | B2 * | 6/2016 | Newburg ................ F02N 11/00 |
| 2004/0166983 | A1 | 8/2004 | Enno |
| 2004/0207276 | A1 | 10/2004 | Chiappe et al. |
| 2008/0066707 | A1 | 3/2008 | Berger |
| 2013/0312552 | A1 * | 11/2013 | Hori ....................... F16H 37/04 74/63 |

OTHER PUBLICATIONS

CN201410524219.1, First Office Action, Apr. 5, 2017, State Intellectual Property Office of People's Republic of China.
CN201410524219.1, English Translation of the First Office Action, Apr. 5, 2017, State Intellectual Property Office of People's Republic of China.

* cited by examiner

AIRCRAFT STARTER MOTOR ASSEMBLY

CROSS-REFERENCE TO RELATED APPLICATIONS

This application is a continuation-in-part application of U.S. patent application Ser. No. 14/046,280 filed Oct. 4, 2013.

FIELD

The disclosure generally relates to the art of aircraft starter motor assemblies.

BACKGROUND

In some propeller driven aircraft, a starter motor assembly is used to turn over the piston engine that drives the propeller. The starter motor assembly is generally constructed to provide a certain torque and to operate at a certain RPM in order to successfully start the engine. However, it has been found for many years that certain starter motor assemblies have suffered from a relatively short operating life. This has resulted in relatively high maintenance costs for such aircraft, unforeseen periods of inoperability due to an unexpected failure of the starter motor and drive, and the potential to damage other parts of the aircraft in certain situations. It would be desirable to at least partially resolve these problems.

SUMMARY

In one aspect an aircraft starter motor assembly for starting an aircraft engine is provided. The assembly includes a DC electric motor, a planetary gearset, a ring gear clutch, and a starter adapter. The DC electric motor has a rotor and a stator. A brush electrically connects a power source to the rotor. The rotor drives a motor output shaft. The planetary gearset includes a ring gear, a planet carrier that holds a plurality of planet gears and a sun gear. The sun gear is mounted to the motor output shaft. The ring gear clutch is controllable to be in an engagement state to fix the angular position of the ring gear and a disengagement state to permit the ring gear to freewheel. The starter adapter including a worm, a worm biasing member, a worm gear, a wrap spring clutch and an adapter output shaft. The worm is driven by the planet carrier and drives the worm gear. The worm is movable linearly between a home position and a torque transfer position and is biased towards the home position by the worm biasing member. Torque transfer to the worm gear caused by rotation of the worm in a first worm direction drives the worm to the torque transfer position against a biasing force of the worm biasing member. The worm gear is drivable in a first rotational direction to bring the wrap spring clutch to a driving state in which the wrap spring clutch is operatively engaged the wrap spring clutch with the adapter output shaft. The adapter output shaft is operatively connected to the aircraft engine and is rotatable by the worm gear for cranking the aircraft engine. The aircraft starter motor assembly is operable in a first mode wherein the ring gear clutch is in the engagement state and the electric motor drives the rotation of the planet carrier. The planet carrier rotates the worm in the first worm direction to transfer torque from the motor to the worm gear, so as to drive the worm gear in the first rotational direction to bring the wrap spring clutch to the driving state so as to cause rotation of the adapter output shaft, so as to crank the aircraft engine.

Bringing the ring gear clutch to the disengagement state disengages the motor from the planet carrier, which in turn permits the worm biasing member to drive the worm towards the home position, which in turn drives rotation of the worm gear in a second direction that is opposite the first direction, which in turn brings the wrap spring clutch to a non-driving state in which the wrap spring clutch is at least partially disengaged from the adapter output shaft.

In another aspect, an aircraft starter motor assembly for starting an aircraft engine is provided, and includes a DC electric motor, a starter adapter, and a motor clutch. The DC electric motor has a rotor and a stator. A brush electrically connects a power source to the rotor, and wherein the rotor drives a motor output shaft. The starter adapter includes a worm having at least four starts, a worm gear, a wrap spring clutch and an adapter output shaft. The worm is driven by the DC electric motor and drives the worm gear. The worm gear is drivable in a first rotational direction to bring the wrap spring clutch to a driving state in which the wrap spring clutch is operatively engaged with the adapter output shaft. The adapter output shaft is operatively connected to the aircraft engine and is rotatable by the worm gear for cranking the aircraft engine. The motor clutch is positionable in an engagement state to permit torque transfer from the DC electric motor through the starter adapter, and a disengagement state to prevent torque transfer from the motor through the starter adapter. The aircraft starter motor assembly is operable in a first mode wherein the motor clutch is in the engagement state and the electric motor drives the rotation of the worm in the first worm direction to transfer torque from the motor to the worm gear, so as to drive the worm gear in the first rotational direction to bring the wrap spring clutch to the driving state so as to cause rotation of the adapter output shaft, so as to crank the aircraft engine. Movement of the clutch to the disengagement state disengages the motor from the worm, which in turn permits returning of the wrap spring clutch to a non-driving state under spring force in the wrap spring clutch, wherein in the non-driving state the wrap spring clutch is at least partially disengaged from the adapter output shaft. Returning of the wrap spring clutch to the non-driving state in turn drives the worm gear in a second direction that is opposite the first direction, thereby back-driving the worm.

In yet another aspect, an aircraft starter motor assembly for starting an aircraft engine is provided and includes a DC electric motor, a motor clutch, a solenoid, a switch, and first and second power sources that are independent of one another. The DC electric motor has a rotor and a stator. A brush electrically connects a power source to the rotor. The rotor drives a motor output shaft that is connected to the aircraft engine to start the aircraft engine. The motor clutch is positionable in an engagement state to permit torque transfer from the DC electric motor to the engine, and a disengagement state to prevent torque transfer from the motor to the engine. The solenoid includes a solenoid coil, a movable member, a first electrical contact and a second electrical contact. The movable member of the solenoid is movable to an engagement position in which the first electrical contact is connected to the second electrical contact. The switch is positionable in a first position in which the first power source is connected to the solenoid coil, and a second position in which the first power source is disconnected from the solenoid coil. The second power source is connected to the first electrical contact and the second electrical contact is connected to a power input terminal for the DC electric motor. Movement of the switch to the first position connects the first power source to the solenoid coil to drive the movable member from the disengagement position to the engagement position so as to connect the second power source to the DC electric motor so as to drive the DC electric motor, and moves the motor clutch to the engaged position to transmit torque from the DC electric motor to the engine. Movement of the switch to the second position disconnects the first power source from the solenoid coil to drive the movable member from the engagement position to the disengagement position so as to disconnect the second power source from the DC electric motor, and moves the motor clutch to the disengaged position.

BRIEF DESCRIPTION OF THE DRAWINGS

The foregoing and other aspects will be more readily appreciated having reference to the drawings, wherein.

DETAILED DESCRIPTION

Figure 1:
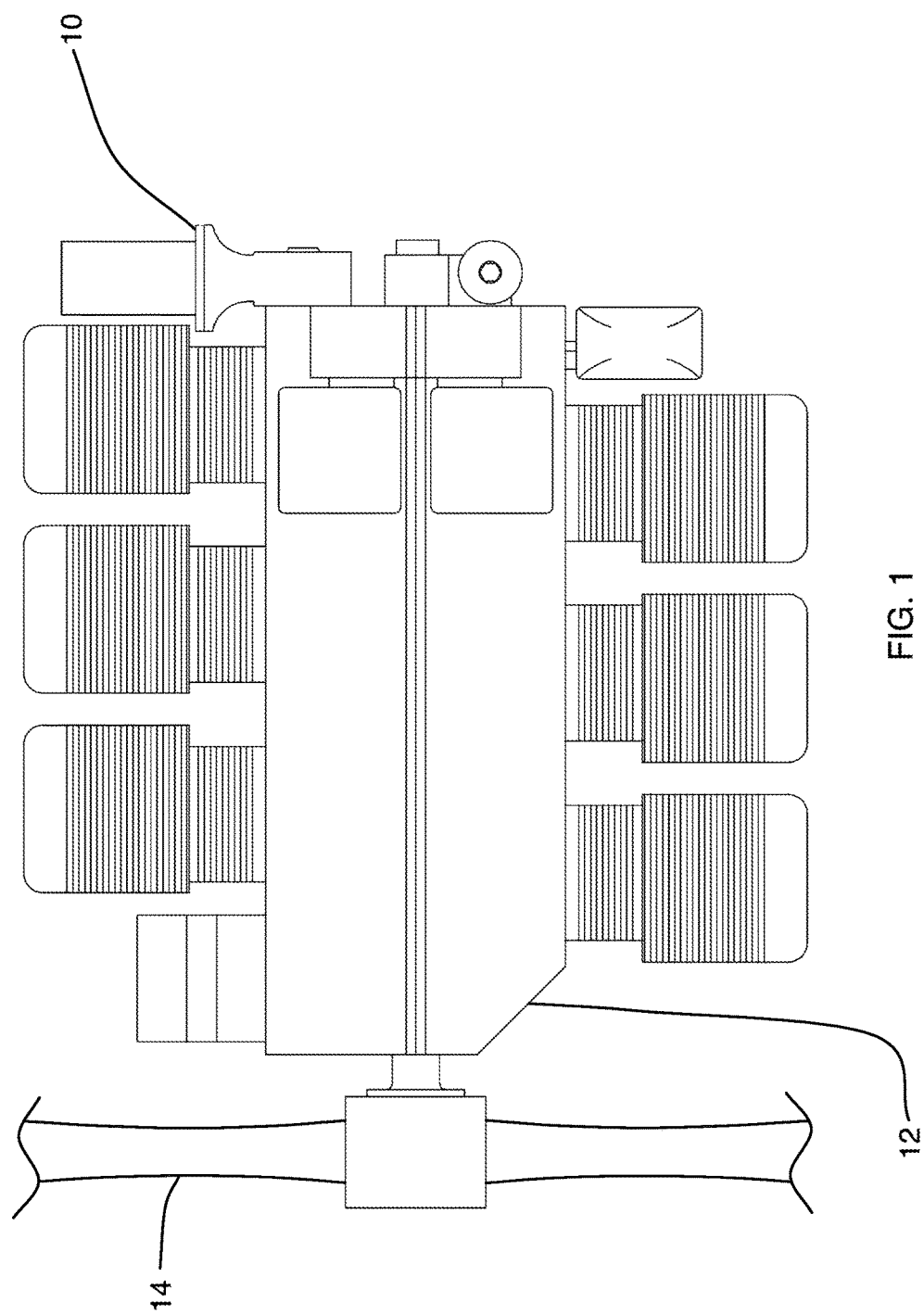
FIG. 1 is a top view of an aircraft engine and a starter motor assembly in accordance with an embodiment of the present invention.
Figure 2:
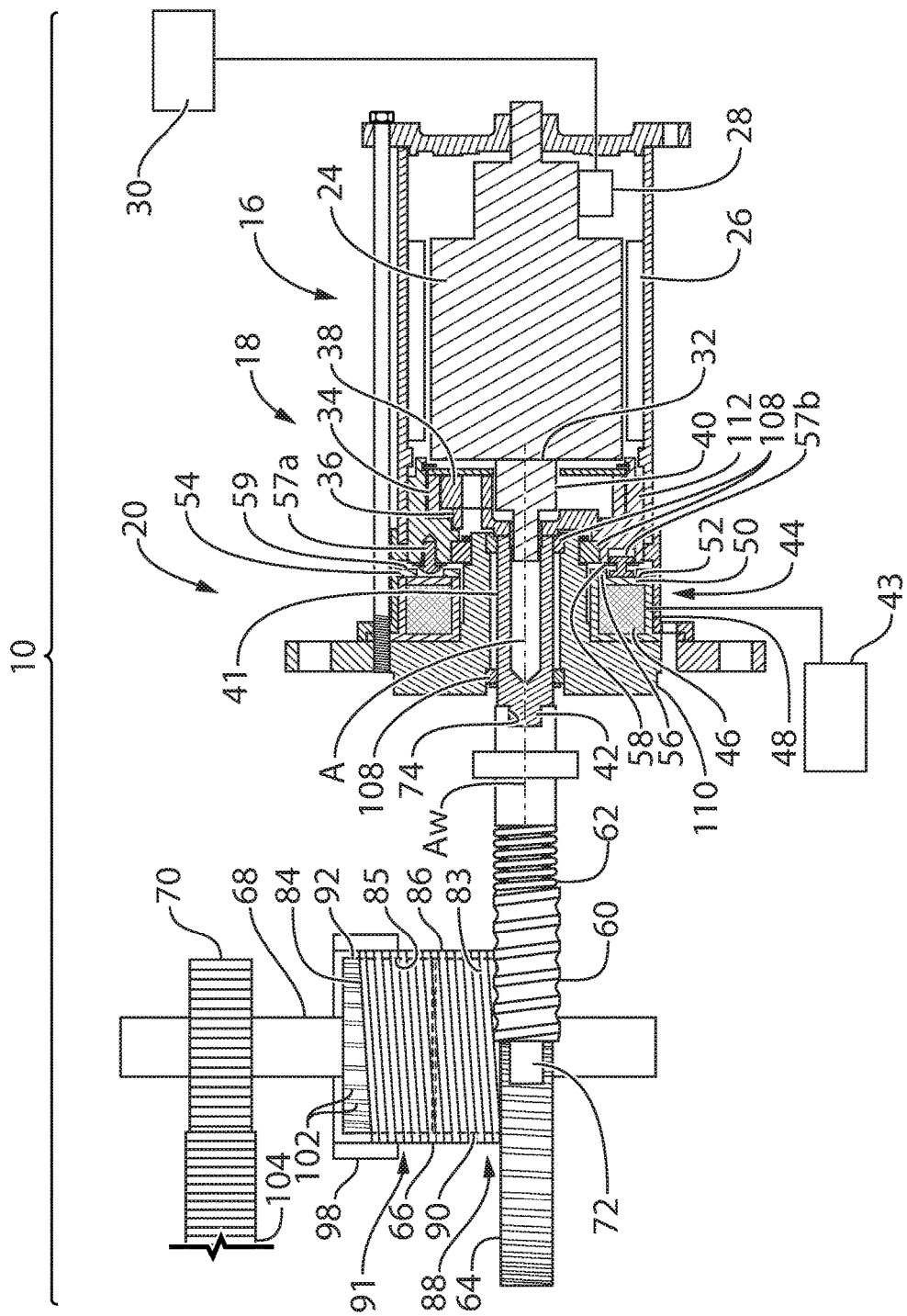
FIG. 2 is a side sectional view of the starter motor assembly shown in FIG. 1 operating in a first mode.

FIG. 1 is a perspective view of an aircraft starter motor assembly 10 that can be used to start an aircraft engine shown at 12. The engine 12 may be a multicylinder (e.g. six-cylinder) piston engine that is used to drive a propeller, shown at 14. Referring to FIG. 2, the starter motor assembly 10 includes an electric motor 16, a planetary gearset 18, a ring gear clutch 20 and a starter adapter 22. The electric motor 16 has a rotor 24 and a stator 26. The electric motor 16 may be called upon to transmit a high amount of torque and may be a permanent magnet, brushed DC motor. In an embodiment, the motor 16 makes about 3.3 hp at 24 VDC and 2.7 hp at 12 VDC. A set of brushes 28 electrically connects a power source (e.g. an on-board battery 30) to the rotor 24. During operation of the motor 16, the rotor 24 drives a motor output shaft 32.

The planetary gearset 18 includes a ring gear 34, a planet carrier 36 that holds a plurality of planet gears 38 and a sun gear 40. The sun gear 40 is mounted to and driven by the motor output shaft 32. The planet carrier 36 may end in a gearset output shaft 41 with a drive feature 42 thereon.

The ring gear clutch 20 is controllable via a controller 43 to be in an engagement state (FIG. 2) to fix the angular position of the ring gear 34 and a disengagement state (FIG. 3) to permit the ring gear 34 to freewheel. The planetary gearset 18 has an associated longitudinal axis A.

The ring gear clutch 20 may include, for example, an electromagnetic coil assembly 44 including an electromagnetic coil 46 and an electromagnetic coil housing 48, a first friction plate 50 that has thereon a first friction surface 52, and a second friction plate 54 that has thereon a second friction surface 56. The first friction plate 50 is rotationally fixed, and may be stationary both axially and rotationally. In the embodiment shown the first friction plate 50 forms part of the electromagnetic coil housing 48. The second friction plate 54 may be movable (e.g. slidable) axially but may be rotationally connected to the ring gear 34 through a friction plate biasing member 58, fasteners 57a and 57b and a support member 112 as described further below.

Energization of the electromagnetic coil 46 (by the controller 43) causes axial movement of at least one of the first and second friction surfaces 52 and 56 into engagement with the other of the first and second friction surfaces 52 and 56 so as to rotationally fix the ring gear 34. In the particular embodiment shown, wherein the first friction plate 50 is stationary axially and rotationally, energization of the electromagnetic coil 46 causes axial movement of the second friction surface 56 into engagement with the first friction surface 52 so as to rotationally fix the ring gear 34.

In some embodiments, energization of the electromagnetic coil 46 brings the ring gear clutch 20 to the engagement state, and deenergization of the electromagnetic coil 46 brings the ring gear clutch 20 to the disengagement state. A friction plate biasing member shown at 58 in FIGS. 2, 6 and 7 may optionally be provided to urge the second friction plate 54 out of engagement with the first friction plate 50. The friction plate biasing member 58 is connected to the support member 112 at first selected points (e.g. three points 120 degrees apart (FIG. 7) at a selected radius from the axis A (FIG. 2)) by first fasteners, shown at 57a. Additionally, the friction plate biasing member 58 is connected to the second friction plate 50 at second selected points (e.g. 120 degrees apart (FIG. 7)) by second fasteners 57b. The second selected points may be 120 degrees apart at the same radius as the first selected points such that the second fasteners 57b alternate with the first fasteners 57a. The fasteners 57a and 57b could be any suitable type of fasteners, such as rivets, screws, or any combination thereof. The friction plate biasing member 58 biases the friction plate 54 away from the friction plate 50 (i.e. out of engagement with the friction plate 50), so that deenergization of the electromagnetic coil 46 brings the ring gear clutch 20 to the disengagement state. By way of the friction plate biasing member 58, the fasteners 57a and 57b and the support member 112, the friction plate 54 is connected rotationally to the ring gear 34.

Figure 7:
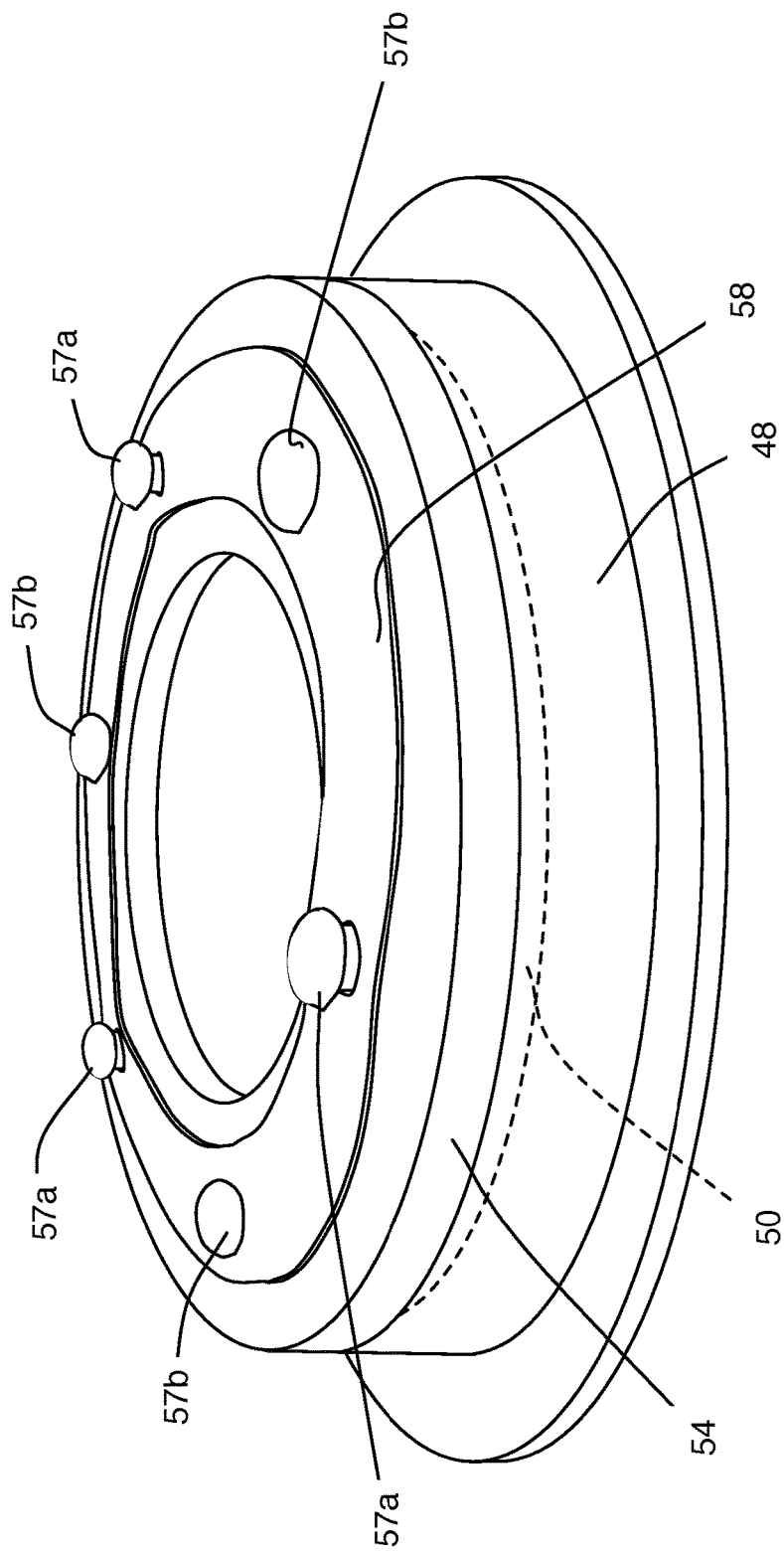
FIG. 7 is a magnified perspective view of a portion of the starter motor assembly shown in FIG. 2.

The friction plate 54 and the friction plate biasing member 58 are shown in FIG. 7. The friction plate biasing member 58 is shown with exaggerated warpage to illustrate the flexing it goes through when the friction plate 54 has pulled away from the support member 112 and is engaged with friction plate 50. As can be seen, the three fasteners 57a (which hold the friction plate biasing member 58 to the support member 112, (not shown in FIG. 7) alternate with the three fasteners 57b (which hold the friction plate biasing member 58 to the friction plate 54).

As a result of the illustrated structure, no energy is required to hold the ring gear clutch 20 in the disengagement state, which is the state it will be in all conditions except when the starter motor assembly 10 is being used to start the engine 12. Thus, there is little or no lost energy associated with the ring gear clutch 20 when the clutch 20 is not in use. In some embodiments the friction plate 54 is spaced from the friction plate 50 by about 0.008 to about 0.010 inches. In some embodiments it has been found that about 1.4 Amps are needed to bring the plates 50 and 54 together. The close spacing of the friction plates 50 and 54 is in part responsible for the low amperage needed to bring them together and to hold them together. The close spacing is possible in part because the biasing member 58 is positioned on the side shown at 59 of the friction plate 54 facing away from the friction plate 50 instead of being positioned between the friction plates 50 and 54.

It will be noted that the friction force that holds the ring gear 34 against rotation is dependent on the normal force (i.e. the force of engagement between the surfaces 52 and 56), the friction coefficient between the surfaces 52 and 56 and the area over which they are engaged. By selecting materials and surface finishes appropriately, a relatively low normal force will be needed in order to satisfactorily hold the ring gear 34. Thus, a relatively low current and power draw may be associated with this arrangement. It has been found that, in use, as little as 8 pounds of force have been needed to hold the ring gear 34 stationary.

In an alternative embodiment the second plate 54 may simply be left to float axially when the electromagnetic coil 46 is not energized, so that it will find an equilibrium position that is just slightly spaced from the first plate 50 on its own without the need for a biasing member.

The gearset 18 may provide any suitable amount of gear reduction. For example, it may provide a gear reduction of about 3.8:1 (e.g. 3.785:1). Any other suitable gear reduction may be used. It will be noted that the force needed to hold the ring gear 34 is relatively low in a planetary gearset, which is advantageous in the assembly 10 since a lower required force reduces even further the normal force (and therefore the current and power draw) needed to hold the ring gear 34.

Figure 6:
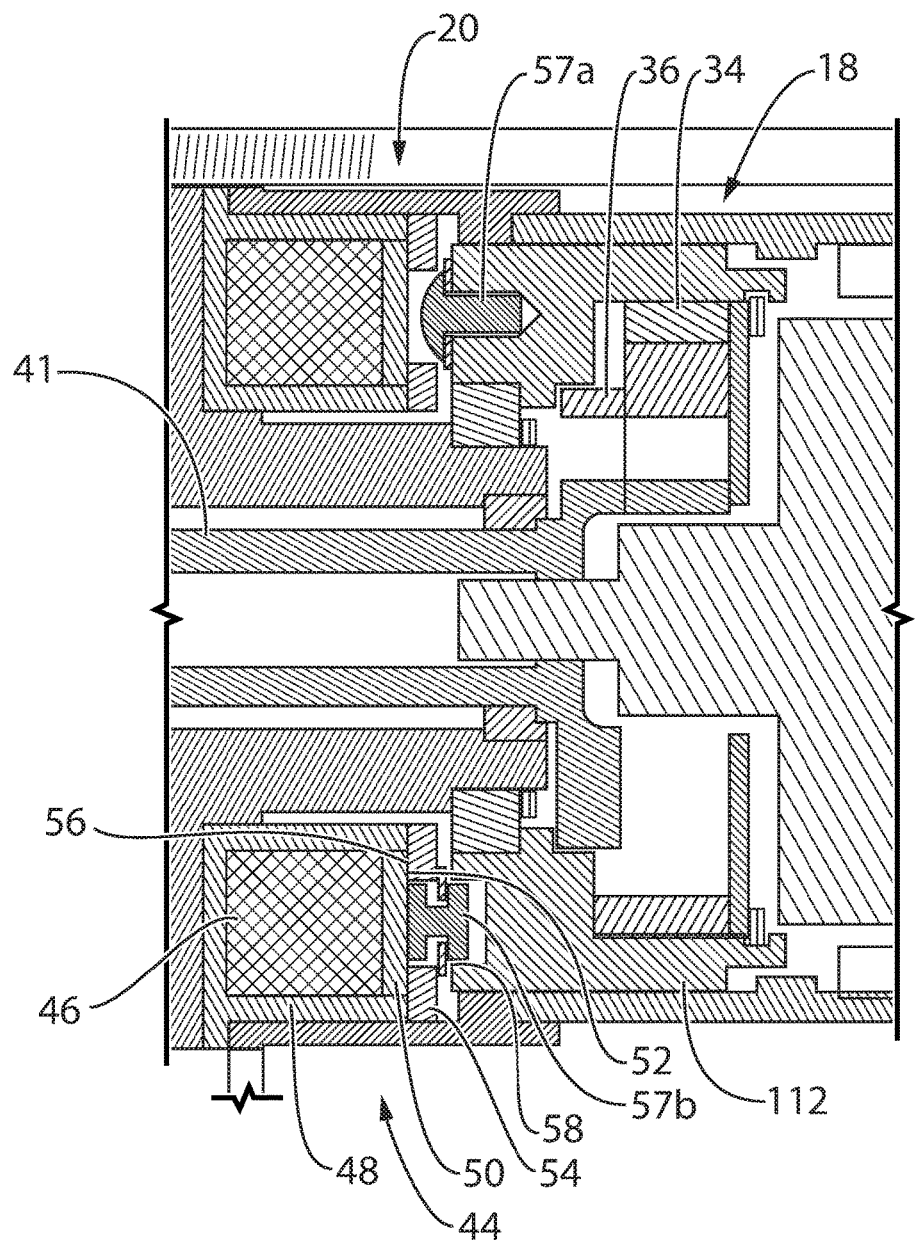
FIG. 6 is a magnified sectional view of a portion of the starter motor assembly shown in FIG. 2.

Referring to FIGS. 2 and 6, the starter adapter 22 includes a worm 60, a worm biasing member 62 (e.g. a compression spring), a worm gear 64, a wrap spring clutch 66 and an adapter output shaft 68 with a final gear 70 thereon. The worm 60 is mounted on a worm shaft 72 that has an input feature 74 that mates with the drive feature 42 on the gearset output shaft 41. The worm 60 is fixed rotationally with the worm shaft 72, but is slidable axially (linearly) along a worm axis Aw on the worm shaft 72. The worm 60 is biased by the worm biasing member 62 between a home position (FIG. 3) and a torque transfer position (FIG. 2). When the worm 60 is driven rotationally by the planet carrier 36, the worm 60 applies a force to cause rotation of the worm gear 64. Resistance to rotation by the engine 12 (FIG. 1) may be sufficiently high such that rotation of the worm 60 does not drive rotation of the worm gear 64 and instead drives movement of the worm 60 linearly away from the home position (to the right in the view shown in FIG. 2), thereby flexing (i.e. compressing) the worm biasing member 62. As the worm 60 moves further from the home position (and towards the torque transfer position) the resistive force of the worm biasing member 62 increases. At some point, either the resistive force of the worm biasing member 62 matches the force urging the worm 60 to move away from the home position, or the worm 60 reaches the end of its travel. Regardless of whichever it is, once this occurs, the worm 60 begins to drive rotation of the worm gear 64. At this point the worm 60 may be said to be in the torque transfer position. Put another way, during operation of the assembly 10 to start the engine 12, torque transfer to the worm gear 64 caused by rotation of the worm 60 in a first rotational direction drives the worm 60 to the torque transfer position against a biasing force of the worm biasing member 62.

Figure 4:
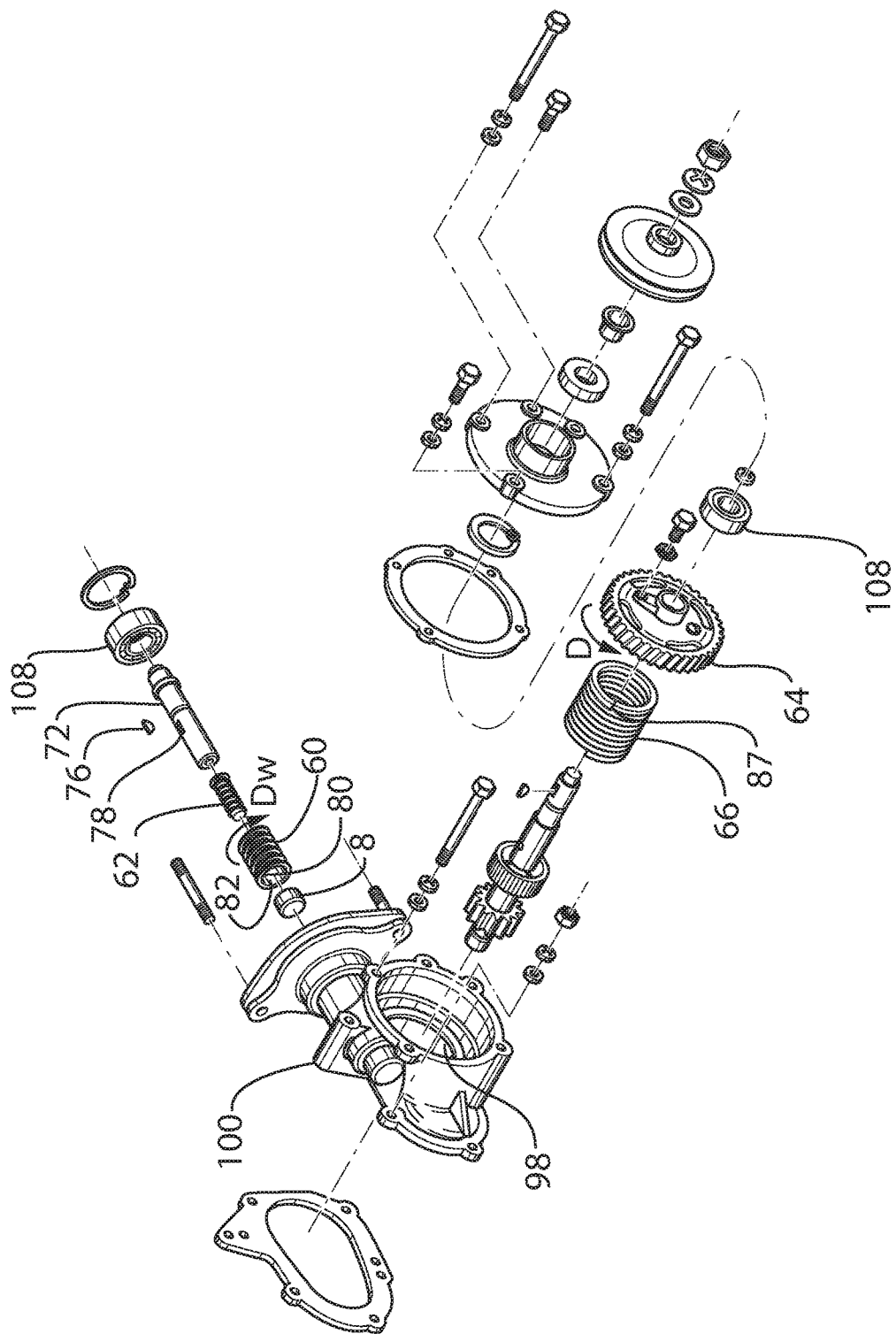
FIG. 4 is a perspective exploded view of a portion of the starter motor assembly shown in FIG. 2.

Referring to FIG. 4, the worm 60 may be axially slidable on the worm shaft 72 by way of engagement between a Woodruff key 76 that mounts in a shaft slot 78 in the worm shaft 72 and that engages a worm slot 80 in a radially inner surface 82 of the worm 60.

The worm 60 in the embodiment shown may have any suitable number of starts. For example, it may be a three-start worm. In some embodiments it may instead be a two-start worm. The worm 60 may be backdrivable in some embodiments. In other embodiments it may be substantially not back drivable.

The wrap spring clutch 66 has a first end 83, a second end 84, a radially inner surface 85 and a radially outer surface 86. At the first end 83, the wrap spring clutch 66 includes a hook feature 87 (FIG. 4) thereon that connects the first end 83 to the worm gear 64. Referring to FIG. 2, a first portion 88 of the wrap spring 66 surrounds a worm gear drum 90 which holds the worm gear 64, and a second portion 91 surrounds the adapter output shaft 68, and more particularly a wrap spring engagement surface 92 on the adapter output shaft 68.

The wrap spring clutch 66 is positionable in a driving state (FIG. 2) in which it has coiled inwardly to grip the worm gear drum 90 and the wrap spring engagement surface 92 so that torque transfer takes place from the worm gear 64 to the adapter output shaft 68. The wrap spring clutch 66 is also positionable in a non-driving state (FIG. 3) in which it has coiled outwardly so that it is at least partially disengaged from the adapter output shaft 68 sufficiently to permit relative movement between the worm gear 64 and the adapter output shaft 68 without generating excessive heat buildup. It is preferable, however, for the wrap spring clutch 66 to be fully disengaged from the output shaft 68, so that there is substantially free movement between the worm gear 64 and the adapter output shaft 68.

A friction ring 98 on a housing 100 (FIG. 4) for the starter adapter 22 is positioned to engage the radially outer surface 86 of the wrap spring clutch 66 proximate the second end 86 and to hold the second end 86 substantially rotationally stationary when the wrap spring clutch 66 is in the non-driving state.

Holding of the second end 86 of the wrap spring clutch 66 by the friction ring 98 permits the worm gear 64 to be drivable in a first rotational direction (shown at D in FIG. 4) to cause inward coiling of the wrap spring clutch 66 so that its inner surface 85 grips the worm gear drum 90 and the wrap spring engagement surface 92 on the adapter output shaft 68, thereby bringing the wrap spring clutch 66 to the driving state. At this point the wrap spring clutch 66 is operatively engaged with the adapter output shaft 68. Continued rotation of the worm gear 64 transfers torque from the worm gear 64 to the adapter output shaft 68.

The wrap spring clutch 66 may be biased towards the non-driving state. This permits the wrap spring clutch 66 to return to the non-driving state upon a release of the torque that drives the worm gear 64.

The wrap spring engagement surface 92 may have a plurality of axially extending grooves 102 thereon that serve to remove debris that may accumulate between the radially inner surface 85 of the wrap spring clutch 66 and the wrap spring engagement surface 92. Additionally, the edges of the grooves 94 assist in cleaning debris from the inner surface 96 of the wrap spring clutch 66. Additionally, the grooves 94 assist in gripping the wrap spring clutch 66 during operation of the starter motor assembly 10 in the first mode.

The adapter output shaft 68 is operatively connected to the aircraft engine, e.g. via engagement of the final gear 70 on the adapter output shaft 68 with an input gear 104 that is connected to the crankshaft (not shown) on the engine 12.

By way of the wrap spring clutch 66, the adapter output shaft 68 is rotatable by the worm gear 64 for cranking the aircraft engine 12 in order to start the aircraft engine.

To start the aircraft engine 12, the aircraft starter motor assembly 10 is operable in a first mode (shown in FIG. 2) wherein the ring gear clutch 20 is brought to the engagement state and the electric motor 16 is energized and drives the rotation of the planet carrier 36 via the sun gear 40. The planet carrier 36 in turn rotates the worm 60 in a first worm direction Dw (FIG. 4) to transfer torque from the motor 16 to the worm gear 64 so as to drive the worm gear 64 in the first rotational direction D to bring the wrap spring clutch 66 to the driving state. This in turn causes rotation of the adapter output shaft 68, so as to crank the aircraft engine 12.

Once the engine 12 has started, power is cut to the motor 16 and the ring gear clutch 20 is brought to the disengagement state, which disengages the motor 16 from the planet carrier 36. This, in turn, releases any torque from the motor 16 on the worm 60, which permits the worm biasing member 62 to drive the worm 60 towards the home position. This movement of the worm 60 towards the home position drives rotation of the worm gear 64 in a second direction that is opposite the first direction D. This in turn brings the wrap spring clutch 66 to the non-driving state.

To assist the components that make up the adapter 22 in operating and releasing when desired, a flow of lubricant (i.e. oil) may be provided into and through the adapter housing 100. Accordingly, the adapter housing 100 may be sealed as necessary to prevent leakage of oil therefrom.

Referring to FIG. 2, bushings and bearings generally shown at 108 may be provided between the motor output shaft 32 and the gearset output shaft 41, between the gearset output shaft 41 and a stationary support 110 for the electromagnetic coil assembly 48, and between the stationary support 110 and the support member 112 that holds the ring gear 34 and the second friction plate 54.

Figure 3:
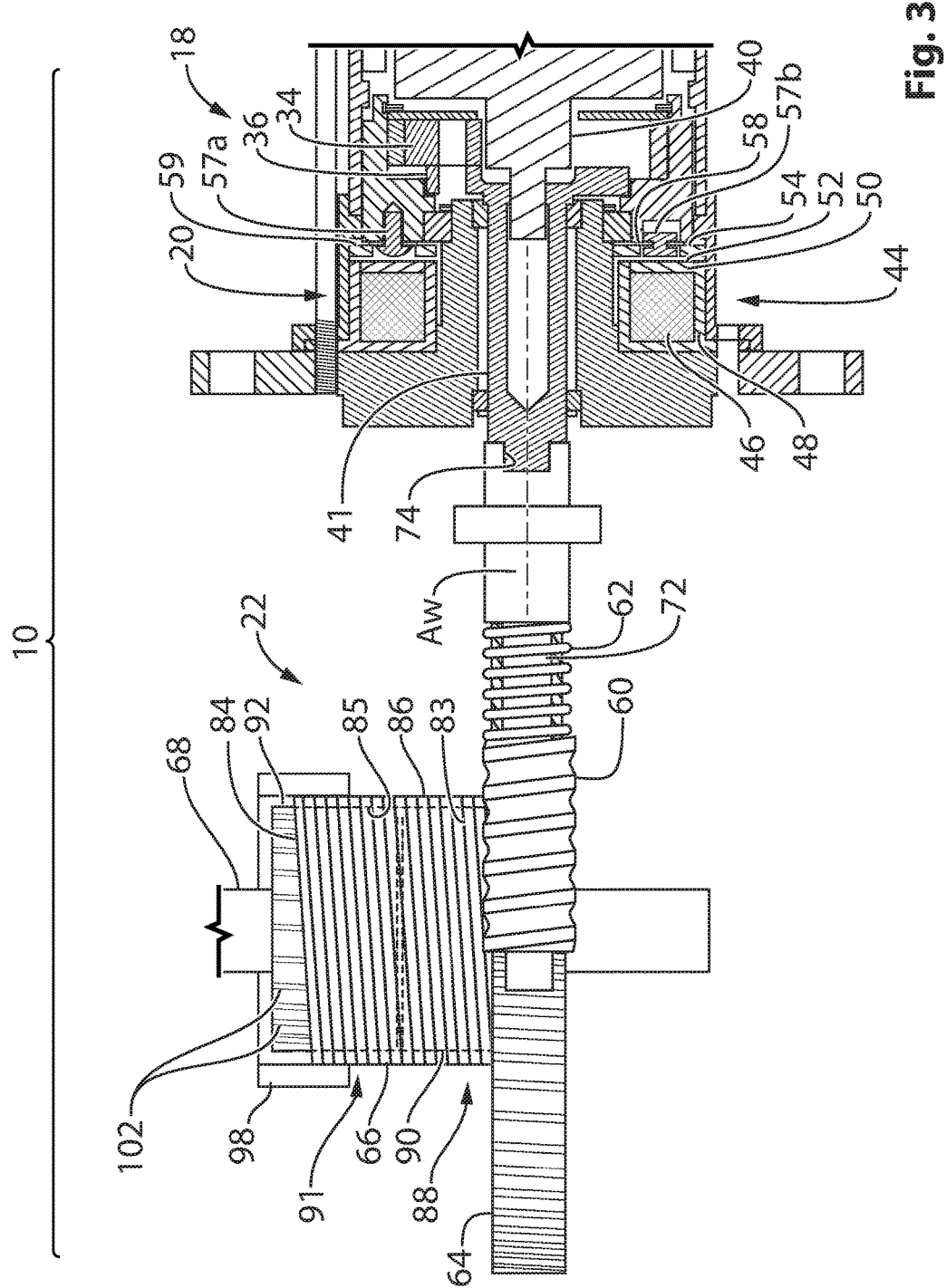
FIG. 3 is a side sectional view of the starter motor assembly shown in FIG. 1 operating in a second mode.

The spacings between components shown in FIGS. 2 and 3 may be exaggerated for the purpose of clarity. As will be understood these drawings are not to scale.

By providing the ring gear clutch 20, it has been found that the amount of resistance in the starter motor assembly 10 to unwinding of the wrap spring clutch 66 is relatively small. By contrast, it has been found that, in a prior art configuration that does not include the ring gear clutch 20, significant resistance was encountered to the unwinding of the associated wrap spring clutch. In some instances this resistive torque can be as high as 15 inch pounds or more at the motor output shaft. When this resistive torque is combined with the gear reduction that takes place with a planetary gearset, the actual resistance to turning of the worm gear in a second direction can be significant. In such cases even if the wrap spring clutch is made to disengage from the adapter output shaft, it does so after significant stresses are incurred, thereby reducing the effective life of the motor starter assembly. In some instances the wrap spring clutch has been found not to disengage completely, which results in significant heat buildup in the adapter. Thus, the ring gear clutch 20 has been found to greatly reduce stresses and heat buildup in the adapter 22 and to extend the effective life of the motor starter assembly 10 as compared to some prior art assemblies. Furthermore, these advantages are provided while consuming very little power. It is also noted that, depending on the position of the pistons in the aircraft's engine when the engine is stopped, there may be some back-rotation of the engine (due to residual pressure in some of the cylinders). In such cases, a prior art starter motor assembly can incur significant stresses if the wrap spring clutch has not properly disengaged with the adapter output shaft.

It has been found that the problem with prior art starter motor assemblies has existed for many years without an effective solution, and has resulted in many instances of premature failure of components such as the wrap spring clutch and the worm gear.

It has been noted above that the worm 60 may be a two-start worm or a three-start worm. In another embodiment, the worm 60 may be a four-start worm. In such an embodiment, the ring-gear clutch described above may be replaced by another clutch that is positionable in an engagement state to permit torque transfer from the DC electric motor 16 through the starter adapter 22, and a disengagement state to prevent torque transfer from the motor 16 through the starter adapter 22.

In general, it has been found that the use of a worm having two starts in some embodiments was advantageous in that it provides a certain amount of gear reduction, and a commensurate amount of torque increase. This permitted the use of a smaller starter motor which helped to reduce cost and weight. It has been found, however, that the two start worm has significant parasitic losses, in the range of 60%, which effectively reduces the amount of torque that is available to start the motor. Furthermore, a two-start motor is not back-drivable, which means that it is, in some embodiments, important to provide the worm biasing member 62 to permit movement of the worm 60 by the worm gear 64. In some embodiments, use of a four-start worm has been found to be advantageous for several reasons however. Because of the reduced gear ration associated with a four-start worm as compared to a two-start worm, when the starter motor 16 is used to start the engine 12, the RPM of the input gear 104 is higher, which facilitates starting of the engine 12 and provides a generally smoother start. It has been found that the four-start worm has significantly reduced parasitic losses, e.g. in the range of 20%, instead of the 60% for the two-start worm. As a result, the amount of torque that is generated at the input gear 104 of the engine 12 using a four-start worm is substantially the same as the amount of torque that is generated using a two-start worm. Furthermore, a four-start worm is back-drivable. This is significant in that it, if a situation occurs where the worm biasing member 62 does not function properly and locks up for some reason, or in embodiments where the worm 60 is not slidable linearly along the shaft 72, the worm gear 64 can still rotate under the urging of the unwinding wrap spring clutch 66 by back-driving the worm 60 if it is a four-start worm.

It will be noted that, use of a four-start worm can render the starter assembly 10 operable with other types of motor clutch, other than the ring gear clutch 20. For example, in such an embodiment, the ring gear 34 may be fixed and instead the gearset output shaft 41 may be connected to the input of a plate clutch or some other suitable type of clutch, which has an output member that is connected to the worm 60.

Figure 5A:
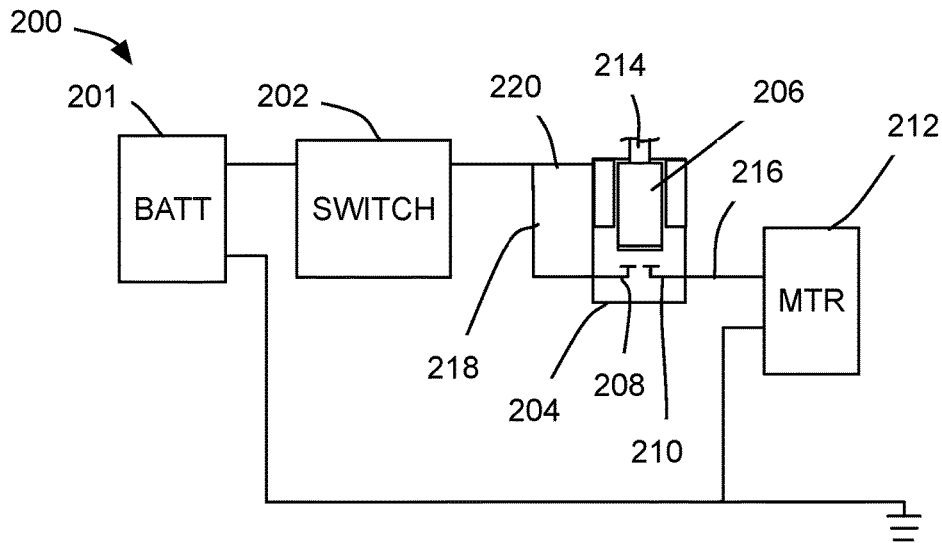
FIG. 5A is a schematic diagram of an electrical circuit used as part of a starter motor assembly of the prior art.
Figure 5B:
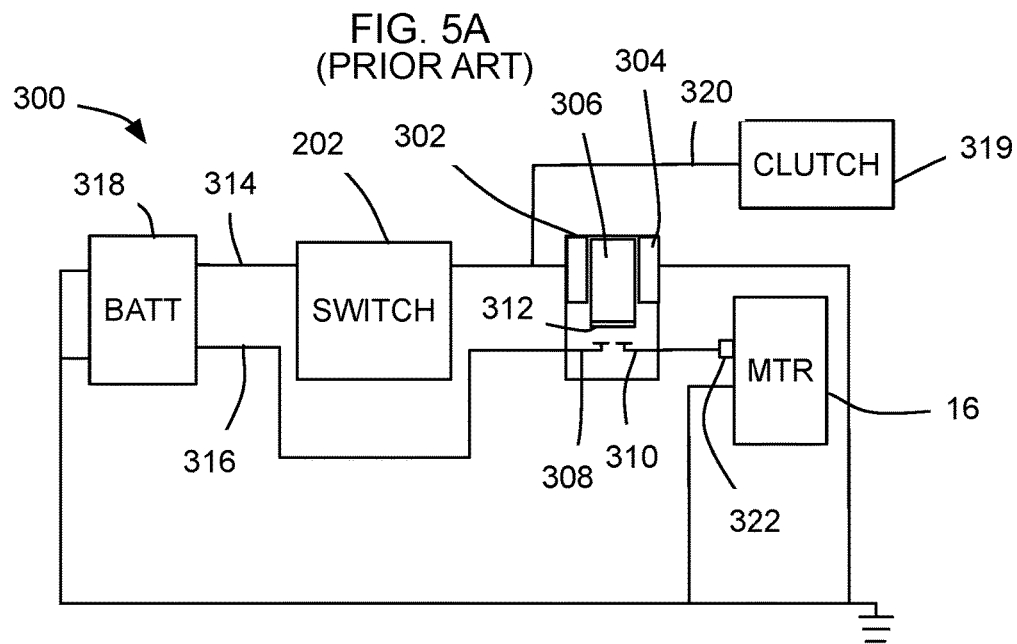
FIG. 5B is a schematic diagram of an electrical circuit used as part of the starter motor assembly shown in FIG. 2.

Another aspect of the invention relates to the electrical circuits shown in FIGS. 5A and 5B. The circuit shown at 200 in FIG. 5A is for a prior art system. In this system, there is a power source 201, such as a battery. A switch 202 controls the transmission of power from the power source 201 to a starter solenoid 204. The switch 202 may be any suitable type of switch such as a key-activated switch, or a push button. The starter solenoid 204 has a movable member 206 therein that is moved forward (downward in the view shown in FIG. 5A) when the switch 202 is closed. When the movable member 206 is moved forward it engages contacts 208 and 210, which permits the transmission of power from the power source 201 to the starter motor shown at 212. Additionally, the movable member 206 has an extension 214 that is external to the solenoid housing and that moves a clutch member (not shown) to drive the clutch member between engaged and disengaged positions. When the movable member 206 is moved forward so that power is sent to the starter motor 212, the extension 214 moves the clutch member to an engaged position, so as to engage the clutch that controls the transmission of mechanical power to the aircraft's engine, so as to start the engine.

A problem arises however, when the switch 202 is opened, indicating that the engine has started and that it is appropriate to disengage the starter motor 212 from the engine. When the switch 202 is opened, the rotor of the starter motor 212 continues to turn for a small period of time until it dissipates its kinetic energy due to friction and other magnetic resistance. During this brief period of time however, the motor 212 can act as a generator, and can generate current in the electrical conduit shown at 216. Because the conduit 216 is connected to the conduit 218 when the movable member 206 is advanced, the current in 216 is transmitted back through conduit 218. Because conduit 218 is connected to conduit 220 which powers the solenoid 204, the movable member 206 is kept in the advanced position during that brief moment by the current developed during the spin down of the motor 212. This is problematic because when the engine turns over and develops its own power it can damage the components of the starter motor assembly if it is driving those components at the same time as the starter motor 212 is driving them. It is therefore important to disengage the starter motor assembly from the engine quickly once the engine turns over. Because of the current being generated by the motor 212 during spin down however, the clutch (not shown) is remaining engaged for longer than is desirable, which can lead to a significantly reduced operating life for the starter motor assembly.

Figure 5C:
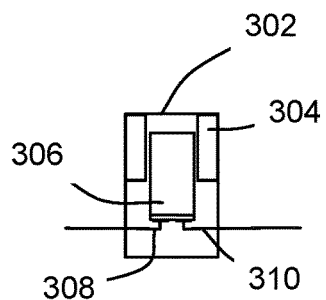
FIG. 5C shows a solenoid in FIG. 5B in an engagement position.

FIG. 5B shows an electrical circuit 300 that can be used with the starter motor assembly 10 shown in FIG. 2. As can be seen in FIG. 5B, a solenoid 302 is provided, which includes a solenoid coil 304, a movable member 306, a first electrical contact 308 and a second electrical contact 310. The movable member 306 is movable to an engagement position (FIG. 5C) in which the first electrical contact 308 is connected (electrically) to the second electrical contact 310. This can be by virtue of a conductive element 312 on the end of the movable member 306. There are two power sources shown, a first power source 314 and a second power source 316 that is independent of the first power source 314. These power sources 314 and 316 may simply be electrical conduits that connect with a common battery 318 (e.g. the aircraft's battery).

A motor clutch is shown at 319, and is positionable in an engagement state to permit torque transfer from the DC electric motor 16 to the engine 12, and a disengagement state to prevent torque transfer from the motor 16 to the engine 12. The clutch 319 may be the ring gear clutch 20 and is thus controlled by sending current to the coil 46 (FIG. 2) though electrical conduit 320 (FIG. 5B). It could alternatively be a clutch that would be driven mechanically by an extension member connected to the movable member 306.

The switch 202 is shown, and is positionable in a first position (e.g. a button-depressed position or key-turned position) in which the first power source 314 is connected to the solenoid coil 304, and a second position in which the first power source 314 is disconnected from the solenoid coil 304. The second power source 316 is connected to the first electrical contact 308 and the second electrical contact 310 is connected to a power input terminal 322 for the DC electric motor 16. Movement of the switch 202 to the first position connects the first power source 314 to the solenoid coil 304 to drive the movable member 306 from the disengagement position (FIG. 5A) to the engagement position (FIG. 5B) so as to connect the second power source 316 to the DC electric motor 16 so as to drive the DC electric motor 16, and moves the motor clutch 319 to the engaged position to transmit torque from the DC electric motor 16 to the engine 12. Movement of the switch 202 to the second position disconnects the first power source 314 from the solenoid coil 304 to drive the movable member 306 from the engagement position to the disengagement position (FIG. 5B) so as to disconnect the second power source 316 from the DC electric motor 16, and moves the motor clutch 319 to the disengaged position.

The solenoid 302 may be any suitable type of solenoid, such as a linear solenoid in which case the movable member 306 is a plunger, or a rotary solenoid in which case the movable member 306 pivots about a solenoid axis.

For greater clarity, the circuit shown in FIG. 5B does not require the use of a worm and worm gear, a wrap spring clutch, or any of the other components of the starter adapter 22 shown in FIG. 2, particularly when there is some means for disengaging the motor 16 from the engine 12, which is provided by the motor clutch 319.

While the above describes one or more particular embodiments, it will be appreciated that modifications and variations may be made to the embodiments described herein without departing from the proper scope of the claims appended hereto.

The invention claimed is:

1. An aircraft starter motor assembly for starting an aircraft engine, comprising:
   a DC electric motor having a rotor and a stator, wherein a brush electrically connects a power source to the rotor, and wherein the rotor drives a motor output shaft;
   a planetary gearset including a ring gear, a planet carrier that holds a plurality of planet gears and a sun gear, wherein the sun gear is mounted to the motor output shaft;
   a ring gear clutch that is controllable to be in an engagement state to fix the angular position of the ring gear and a disengagement state to permit the ring gear to freewheel; and
   a starter adapter including a worm, a worm biasing member, a worm gear, a wrap spring clutch and an adapter output shaft, wherein the worm is driven by the planet carrier and drives the worm gear, wherein the worm is movable linearly between a home position and a torque transfer position and is biased towards the home position by the worm biasing member, wherein torque transfer to the worm gear caused by rotation of the worm in a first worm direction drives the worm to the torque transfer position against a biasing force of the worm biasing member, wherein the worm is a four start worm;
   wherein the worm gear is drivable in a first rotational direction to bring the wrap spring clutch to a driving state in which the wrap spring clutch is operatively engaged with the adapter output shaft, wherein the adapter output shaft is operatively connected to the aircraft engine and is rotatable by the worm gear for cranking the aircraft engine, wherein the aircraft starter motor assembly is operable in a first mode wherein the ring gear clutch is in the engagement state and the electric motor drives the rotation of the planet carrier, wherein the planet carrier rotates the worm in the first worm direction to transfer torque from the motor to the worm gear, so as to drive the worm gear in the first rotational direction to bring the wrap spring clutch to the driving state so as to cause rotation of the adapter output shaft, so as to crank the aircraft engine, and wherein bringing the ring gear clutch to the disengagement state disengages the motor from the planet carrier, which in turn permits the worm biasing member to drive the worm towards the home position, which in turn drives rotation of the worm gear in a second direction that is opposite the first direction, which in turn brings the wrap spring clutch to a non-driving state in which the wrap spring clutch is at least partially disengaged from the adapter output shaft.

2. An aircraft starter motor assembly as claimed in claim 1, wherein the starter adapter includes a friction ring that is positioned to engage a radially outer surface of a portion of the wrap spring clutch and to hold the portion substantially rotationally stationary when the wrap spring clutch is in the non-driving state.

3. An aircraft starter motor assembly as claimed in claim 2, wherein the wrap spring clutch is biased towards the non-driving state.

4. An aircraft starter motor assembly as claimed in claim 1, wherein the planetary gearset has an associated longitudinal axis, wherein the ring gear clutch includes an electromagnetic coil, a first friction surface that is rotationally fixed and a second friction surface that is rotationally connected to the ring gear, wherein energization of the electromagnetic coil causes axial movement of at least one of the first and second friction surfaces to the other of the first and second friction surfaces so as to rotationally fix the ring gear.

5. An aircraft starter motor assembly as claimed in claim 4, wherein energization of the electromagnetic coil causes axial movement of the second friction surface into engagement with the first friction surface so as to rotationally fix the ring gear.

6. An aircraft starter motor assembly as claimed in claim 5, wherein the second friction surface is positioned on a plate that is rotationally connected to the ring gear, but that is axially slidable, and wherein the first friction surface is stationary.

7. An aircraft starter motor assembly as claimed in claim 1, wherein the sun gear, the ring gear and the planet gears are configured to provide a gear reduction of about 3.8:1.

8. An aircraft starter motor assembly for starting an aircraft engine, comprising:
a DC electric motor having a rotor and a stator, wherein a brush electrically connects a power source to the rotor, and wherein the rotor drives a motor output shaft;
a starter adapter including a worm having at least four starts, a worm gear, a wrap spring clutch and an adapter output shaft, wherein the worm is driven by the DC electric motor and drives the worm gear, wherein the worm gear is drivable in a first rotational direction to bring the wrap spring clutch to a driving state in which the wrap spring clutch is operatively engaged with the adapter output shaft, wherein the adapter output shaft is operatively connected to the aircraft engine and is rotatable by the worm gear for cranking the aircraft engine; and a motor clutch that is positionable in an engagement state to permit torque transfer from the DC electric motor through the starter adapter, and a disengagement state to prevent torque transfer from the motor through the starter adapter, wherein the aircraft starter motor assembly is operable in a first mode wherein the motor clutch is in the engagement state and the electric motor drives the rotation of the worm in the first worm direction to transfer torque from the motor to the worm gear, so as to drive the worm gear in the first rotational direction to bring the wrap spring clutch to the driving state so as to cause rotation of the adapter output shaft, so as to crank the aircraft engine, and wherein movement of the clutch to the disengagement state disengages the motor from the worm, which in turn permits returning of the wrap spring clutch to a non-driving state under spring force in the wrap spring clutch, wherein in the non-driving state the wrap spring clutch is at least partially disengaged from the adapter output shaft, wherein returning of the wrap spring clutch to the non-driving state in turn drives the worm gear in a second direction that is opposite the first direction, thereby back-driving the worm.

9. An aircraft starter motor assembly as claimed in claim 8, wherein the worm is movable linearly between a home position and a torque transfer position and is biased towards the home position by a worm biasing member, wherein torque transfer to the worm gear caused by rotation of the worm in a first worm direction drives the worm to the torque transfer position against a biasing force of the worm biasing member, wherein disengagement of the motor from the worm, which in turn permits the worm biasing member to drive the worm towards the home position, which in turn drives rotation of the worm gear in a second direction.

10. An aircraft starter motor assembly for starting an aircraft engine, comprising:
a DC electric motor having a rotor and a stator, wherein a brush electrically connects a power source to the rotor, and wherein the rotor drives a motor output shaft that is connected to the aircraft engine to start the aircraft engine;
a motor clutch that is positionable in an engagement state to permit torque transfer from the DC electric motor to the engine, and a disengagement state to prevent torque transfer from the motor to the engine,
a solenoid including a solenoid coil, a movable member, a first electrical contact and a second electrical contact, wherein the movable member of the solenoid is movable to an engagement position in which the first electrical contact is connected to the second electrical contact;
a first power source and a second power source that is independent of the first power source; and
a switch that is positionable in a first position in which the first power source is connected to the solenoid coil, and a second position in which the first power source is disconnected from the solenoid coil,
wherein the second power source is connected to the first electrical contact and the second electrical contact is connected to a power input terminal for the DC electric motor,
wherein movement of the switch to the first position connects the first power source to the solenoid coil to drive the movable member from the disengagement position to the engagement position so as to connect the second power source to the DC electric motor so as to drive the DC electric motor, and moves the motor clutch to the engaged position to transmit torque from the DC electric motor to the engine, and wherein movement of the switch to the second position disconnects the first power source from the solenoid coil to drive the movable member from the engagement position to the disengagement position so as to disconnect the second power source from the DC electric motor, and moves the motor clutch to the disengaged position.

11. An aircraft starter motor assembly as claimed in claim 10, wherein the first and second power sources are separate electrical conduits that connect to a common battery.

* * * * *